Figure 1:
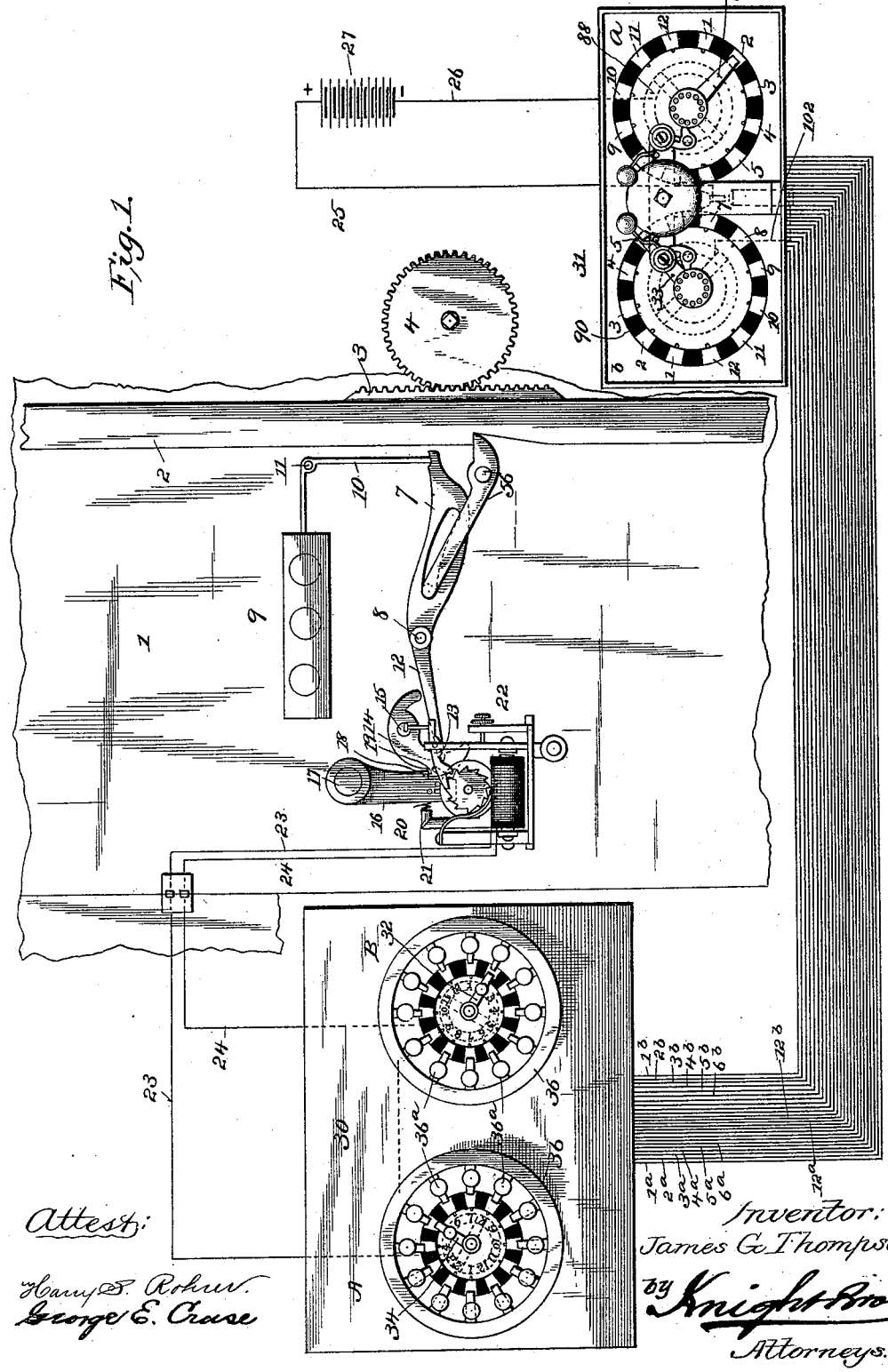

(No Model.) 5 Sheets—Sheet 1.

J. G. THOMPSON.
ELECTRIC LOCK.

No. 471,913. Patented Mar. 29, 1892.

Attest:
Harry S. Rohrer
George E. Chase

Inventor:
James G. Thompson
by Knight Bros.
Attorneys.

(No Model.) 5 Sheets—Sheet 2.
J. G. THOMPSON.
ELECTRIC LOCK.
No. 471,913. Patented Mar. 29, 1892.
FIG. 2.
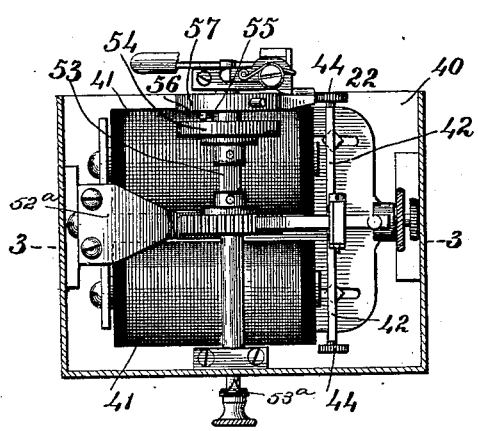
FIG. 3.
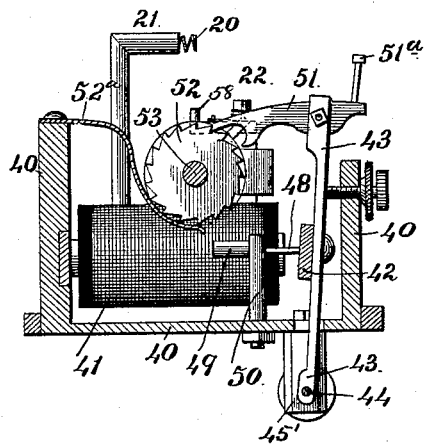
FIG. 4.
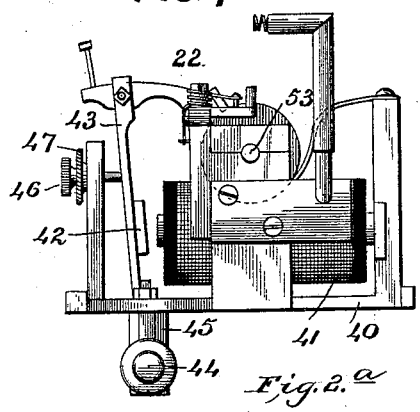
Fig. 2.ᵃ
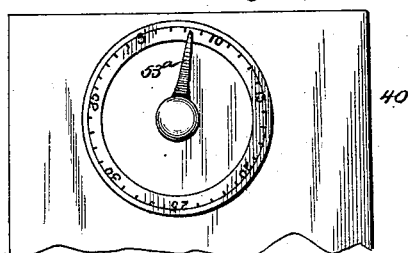
Attest:
Harry D. Rohrer
George E. Cruse
Inventor:
James G. Thompson
By Knight Bros.
Attorneys.
THE NORRIS PETERS CO., PHOTO-LITHO., WASHINGTON, D. C.

(No Model.) 5 Sheets—Sheet 3.
J. G. THOMPSON.
ELECTRIC LOCK.
No. 471,913. Patented Mar. 29, 1892.
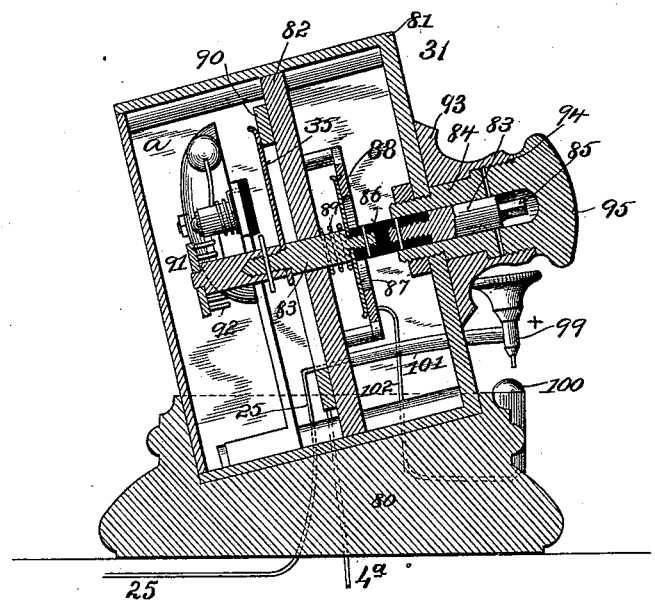
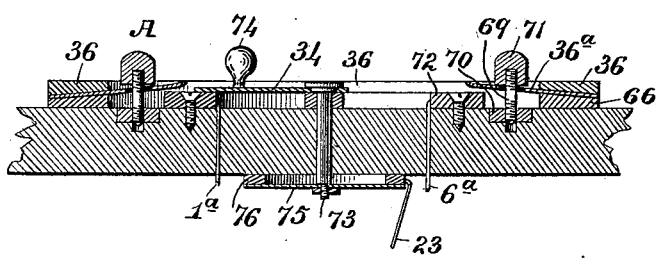
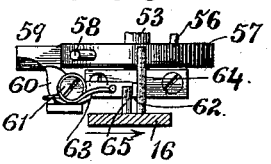
Attest:
Harry S. Rohrer
George E. Curé
Inventor:
James G. Thompson
By Knight Bros
Attorneys.

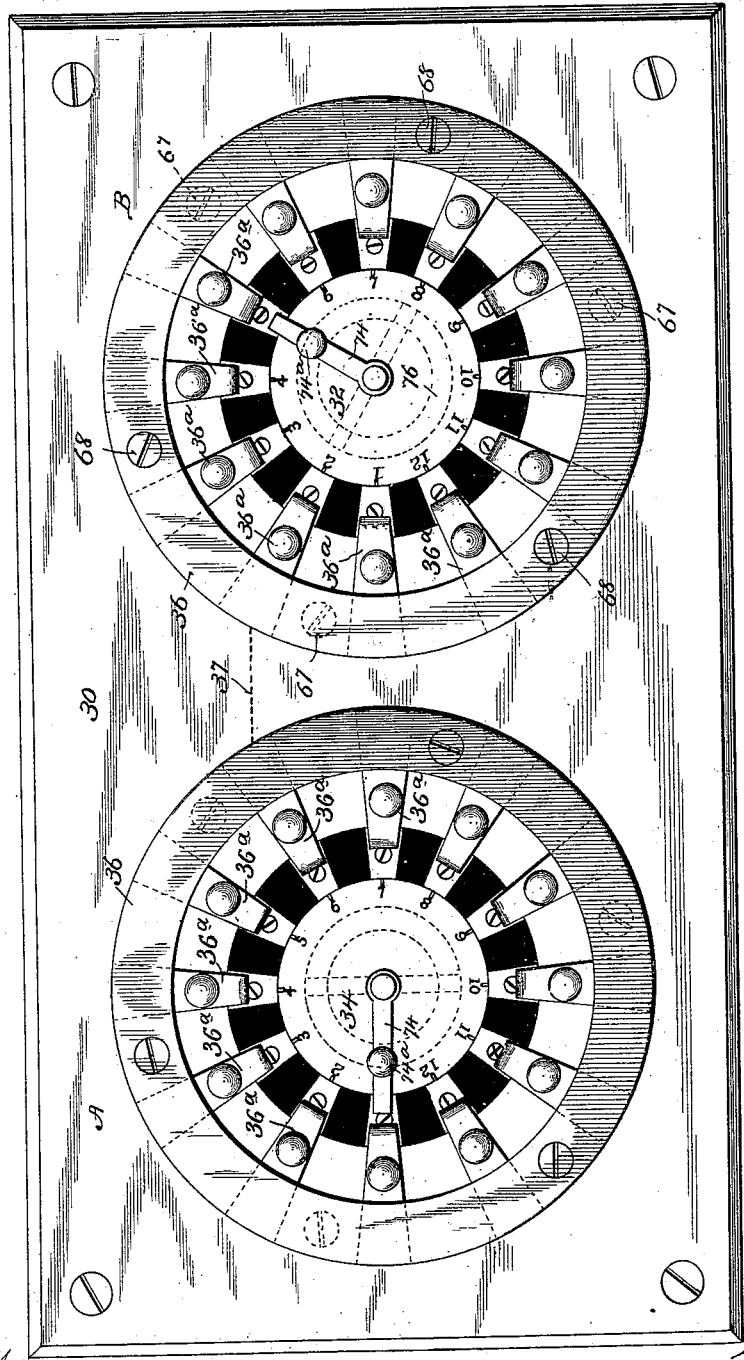

(No Model.) 5 Sheets—Sheet 5.

J. G. THOMPSON.
ELECTRIC LOCK.

No. 471,913. Patented Mar. 29, 1892.

Attest:
Harry S. Rohrer
George E. Cruse

Inventor:
James G. Thompson.
By Knight Bros.
Attorneys.

UNITED STATES PATENT OFFICE.

JAMES GRAHAM THOMPSON, OF BOSTON, MASSACHUSETTS.

ELECTRIC LOCK.

SPECIFICATION forming part of Letters Patent No. 471,913, dated March 29, 1892.

Application filed August 12, 1891. Serial No. 402,467. (No model.)

*To all whom it may concern:*

Be it known that I, JAMES GRAHAM THOMPSON, a citizen of Scotland, residing at Boston, (Charlestown,) in the State of Massachusetts, have invented a new and useful Combination Electric Lock, of which the following is a specification.

My invention is adapted for use in connection with locks for burglar-proof vaults, and has for its object to provide a combination electric controlling system which may be used either independently or as a supplemental safeguard to any suitable form of time or other lock and is adapted to co-operate with the time-lock and control the same set of levers.

My invention consists in the combination, with the lock-operating levers, of an electro-magnetic controlling device, a circuit including said controlling device, and a suitable source of electricity, combination circuit setting and closing devices, and a short-circuit safety device.

More specifically, the controlling device consists of a locking device, a revolving disk having means for engaging the locking device and lever, a ratchet by which the disk may be rotated, a pawl adapted for engagement with the ratchet, and an armature of an electro-magnet for operating the pawl. The combination circuit setting and closing devices are inserted in the controlling-circuit by separating both wires and connecting the four ends, as will hereinafter appear. These devices are substantially alike in that each consists of a pair of moving contact-arms and two sets of insulated contacts, with which the respective arms may be brought into contact. The corresponding contact-plates of the two devices are connected together, and each of the moving contact-arms has electrical connection with one of the four ends of the controlling-circuit. With these parts thus connected and the setting device turned on any two of the contacts it will be impossible for the current to travel from the battery to the electro-magnetic controlling device unless the pair of contact-arms in the circuit-closing device are turned on corresponding contacts. Now since the circuit-closing device has a large number of contacts it is obvious that it would be practically impossible to determine the proper combination of wires by trying all combinations. The circuit-setting device is located, preferably, in the vault, and has, as a further safeguard to make it impossible to determine the wires in circuit by testing, a short-circuit device. The circuit-closing device is located on the cashier's desk or in any other convenient place. The electro-magnetic releasing device operates the lever by means of a pin in its rotating disk, and in order to vibrate the magnet-armature a sufficient number of times to cause the pawl to turn the ratchet and through it the disk a circuit-closing key is inserted in the circuit at the operating device, so that after the proper circuits are established the electro-magnetic controlling device may be operated at will.

My invention also consists in certain other novel features and details in the construction of the several parts, all of which will be particularly pointed out in the claims, being first fully described with reference to the accompanying drawings, in which—

Figure 1 is a diagram representing the application of my invention to the bolt-work of a burglar-proof vault in which a time-lock is also employed. Fig. 2 is a plan of the electro-magnetic controlling device. Fig. 2ª is an end elevation of the same incased. Fig. 3 is a vertical section of the same on the line 3 3, Fig. 2. Fig. 4 is a side elevation of the same, looking in the direction of the arrow, Fig. 2, and in the opposite direction to Fig. 3. Fig. 5 is a detail plan of a portion of the electro-magnetic controlling device shown in Figs. 1, 6, 7, and 8, and the fourth lever, illustrating the locking and releasing connections between the electro-magnetic controlling device and the fourth lever.

Referring to Fig. 1, 1 represents a portion of the door of a vault or other receptacle, and 2 is a vertically-sliding bar upon said door, which may either control locking-bolts or may itself effect the locking, when elevated to a particular position, by means of a rack 3, formed upon said bar, and a pinion 4, which engages the rack. This bar is presumed to unlock the door by dropping down, and it is supported in its elevated position by means of a lever 5, which is pivoted at 6, and has its inner end controlled by a cam-lever 7, pivoted at 8. The lever 7 is locked against upward movement, which would allow the lever 5 to discharge its load by means of the bell-crank lever 11 of an ordinary time-lock 9.

So much of the device which I have shown is not my invention, and it is simply shown to illustrate the adaptation of my invention to a vault-door. I desire it understood, however, that my invention is equally applicable to any other form of bolt-work which may be employed in connection with a vault-door.

In order to establish working connection between the above-described controlling-levers and my improved combination electric lock, the lever 7 is extended so as to form a rear arm 12, and this arm is engaged by a pair of levers, so as to prevent the levers 5 and 7 from discharging their burden after the time-lock does its work, as will hereinafter appear.

I have shown my device in use as a supplemental safeguard to the time-lock; but it is obvious that since the lever 7 remains under the control of my device after it is released by the time-lock my device is adapted for use as well by itself as in connection with a time-lock. The end of the lever 12 is engaged, as shown at 13, by a lever 14, pivoted at a point 15, almost over the end of said lever 7, so that the weight of the heavy vertical bar 2 (about seventy-five (75) pounds) is nearly all borne by the pivot 15 of the lever 14, and is not to a very great extent transmitted to the electro-magnetic controlling device. In order to insure the disengagement of the lever 14 with arms 12 the pivot 15 is located a little to one side of the vertical line of arm 12, and the notch in said lever 14 may also be formed so as to assist in the disengagement.

16 represents a fourth lever in the train, and this hangs vertically from a pivot 17 and has a shoulder 18, which normally engages a shoulder 19 on lever 14, and thereby prevents the swinging of said lever 14 and consequent disengagement of the arm 12 therefrom. The lever 16 has a spiral spring 20, mounted in a housing 21, which forces said lever into engagement with lever 14. Thus far the levers described are arranged for the purpose of reducing the great force developed by the dropping of the seventy-five-pound bar 2 on the end of lever 5, and at the same time giving said levers sufficient freedom of movement to insure the release of said bar 2 from lever 5 at the proper time without fail.

In order to securely lock the lever 16 into engagement with lever 14 and to positively disengage the same therefrom, I provide a specially-constructed electro-magnetic controlling device 22, which will hereinafter be minutely described with reference to Figs. 2, 3, 4, and 5. The electro-magnetic device is connected by wires 23, 24, 25, and 26 with a suitable source of electricity 27; but between the respective pairs of wires 23, 24, 25, and 26 is inserted a pair of circuit-setting switches B $b$ A $a$ and their connecting-wires. Each switch has twelve (more or less) contacts, and corresponding plates of the pairs are connected by individual wires, so that both the supply and return wires of the circuit are guarded by twelve (more or less) wires. When it is considered that a through circuit can only be obtained by the combination of the exact two wires in the respective sides of the circuit and that the number of combinations to be made between two sets of twelve wires is one hundred and forty-four, the difficulty met with in an attempted solution of the circuit will be appreciated. Further safeguards, however, are provided. One of these is a circuit-closing key in the operating-instrument, which must be operated to close the circuit a certain number of times when the proper circuit is established, as will be hereinafter fully described in connection with the operating-instrument with reference to Figs. 8, 9, and 10. Another safeguard is a short-circuiting device, which is so arranged as to indicate a closed circuit, no matter what pair of wires is used, and yet not interfere with the proper working circuit when established. The value of this attachment is owing to the method necessarily resorted to in an attempt to discover the working circuit, and which is to cut the wires and apply a source of electricity and galvanometer to the various combinations of wires until a certain pair indicates a closed circuit. The short-circuiting device indicates a closed circuit with any combination of wires, and the device is applied to the circuit-setting device to be located within the vault. The short-circuiting attachment consists, primarily, of rings 36, connected by a wire 37 and surrounding the respective contact-circles of the circuit-closer, said rings being provided with adjustable arms $36^a$, adapted to be depressed upon the respective contacts. The circuit-setting device and its short-circuiting attachment will be hereinafter described with special reference to Figs. 6 and 7.

Referring to Figs. 2, 3, and 4, which represent the electro-magnetic device, and to Fig. 5, which represents its working connection with the fourth lever 16, the electro-magnetic device 22 is constructed with a suitably-formed base 40, preferably of non-magnetic material, a pair of electro-magnets 41, and an armature 42, mounted on a vertical lever 43, fulcrumed between screws 44 in a bracket 45, and having an adjustable stop-screw 46, with lock-nut 47. The armature is further provided with a new and improved spring controlling device, which consists of a piston 48, connected with the armature and working in a spiral-spring cylinder 49, mounted on a post 50. 51 represents a pawl pivoted in the upper end of the armature-lever and adapted to engage a ratchet-wheel 52, mounted upon a horizontal shaft 53. The armature of the magnet is thus adapted to rotate the wheel 52 in one direction, and the proportions of the parts are such that the wheel is forwarded the portion of a revolution measured by one tooth each forward impulse of the armature. The circuit through the magnets being closed, the movement of the armature in opposite directions will be controlled by make and brake effected by the key in the operating-instrument. 52$^a$ represents a spring-brake fixed to the frame 40, and bearing against the periphery of wheel 52 to prevent the running of the same when it is advanced suddenly by the forward impulse of the armature and to hold the ratchet against the influence of spiral spring 20, which might be transmitted through the lever 16, pin 58 on wheel 57, and wheel 54, as will hereinafter appear, after the fourth lever has been shifted. The shaft 53 is further provided with a wheel 54 keyed thereto, and this wheel 54 has a pin 55 on its face adapted to engage a pin 56 upon another wheel 57, which is loosely mounted upon the shaft 53. The wheel 57 has a pin 58 and a cam 59, both located upon its periphery. 60 represents a bell-crank lever fulcrumed at 61 on a fixed post of the frame and having an upturned end 62 and a spiral spring 63 so attached as to force the upturned end 62 outward. The cam 59 is adapted to engage the inner end of the lever 60 and force said end outward in opposition to the spiral spring when the wheel 57 rotates far enough to bring the cam 59 into contact with the said inner end. Upon the fourth lever 16 of the bolt-work, hereinbefore described, are mounted two pins 64 and 65, which project inward to different distances. The longest pin 64 is adapted to be disengaged by the pin 58 on the periphery of the wheel 57, while the shorter pin 65 is engaged by the upturned end 62 of the bell-crank lever 60. While the pin 58 is shown slightly in advance of the cam 59, the location of the inner end of the lever 60 is such that it is engaged by the cam 59 before the pin 58 comes in contact with pin 64, and by this engagement the bell-crank lever is rocked upon its fulcrum 61, so as to withdraw the upturned end 62 from the short pin 65 before the pin 58 engages the pin 64. Inasmuch as the lever 16, in order to release the other levers and permit the vertical bar to be dropped, must be moved in the direction of the arrow shown in Fig. 5, it is obvious that the effect of the upturned end 62 of lever 60 will be to secure the locking of said lever 16 when in engagement with its pin, while the effect of the pin 58 is to move the fourth lever in the direction which causes the release of the vertical bar. It will therefore be seen that the fourth lever is securely locked until such time the lever is to be moved, when the locking device will be released just before the pin 58 comes in contact with the pin 64 and moves said fourth lever. As hereinbefore explained, the fourth lever 16 has a return-spring 20 mounted on the cylinder 21, and after the vertical bar is allowed to drop the parts of the electro-magnetic controlling device will be returned to their normal positions by means of their respective springs as soon as the central bar has been raised and the wheel carrying the pin and cam 58 59 has been turned back. The pin 55 on wheel 54 is adapted to connect with both sides of the pin 56 on the loose wheel 57, so that the wheel 54 may make one complete revolution before restoring the wheel 57, and it will thus be seen that the range of motion of the attached wheel 52 is equivalent to two revolutions. It may therefore be arranged so as to necessitate the closing of the circuit by means of the key a great number of times after the proper circuits have been established before the fourth lever will be released. By the particular arrangement of the spiral-spring cylinder 49 and piston 48 and the location of the same between the magnets much valuable space is saved and a heretofore unused space occupied instead. In order that the pawl 51 may be raised, it is provided on its outer end with a stem 51, which may extend through the top of the casing, and which may surround the electro-magnetic device when in use. The shaft 53 is provided on its forward end with an index 53$^a$ and a milled turning-head, and by this means the ratchet-wheel may be turned back any desired distance, and the index will show how far forward it must be turned again in order to effect the release of the levers, or, in other words, will indicate the number of impulses of the armature necessary to be caused by the depression of the circuit-closing key.

Referring to Figs. 6 and 7, which represent the details in the construction of the circuit-setting device 30 and the short-circuiting attachment, 36 represents the metallic ring which carries the contact-springs 36$^a$, which are secured between the under beveled face of said ring 36 and an oppositely-beveled ring 66. The under ring is secured to the board upon which the device is mounted by means of screw 67, while the upper ring is secured by means of screws 68. The contact-springs 36$^a$ are thus given an upwardly-inclined set, and they are normally held down upon the contacts 1 2 3, &c., of the contact-circle 72 by means of screws 69, which enter a ring 70 at bottom and are provided with turning-knobs 71 at top. When the switch-arm 74 is set upon any one of the contacts 1 2 3, &c., the corresponding contact-spring 36$^a$ of the short-circuiting ring 36 is disconnected from said contact, so that the current will pass through the arm 34 and the individual wire which connects the particular contact in use with the corresponding contact in the operating device. All the wires which are connected to the other contacts in the contact-circle will be short-circuited through their respective contacts, the contact-springs 36$^a$, and the short-circuiting ring 36. The contact-arm 34 of the switch is mounted upon a central shaft 73, and said contact-arm is provided for convenience with a knob 74$^a$, by which it may be turned on any particular contact in the ring. 75 represents an additional contact-arm on the opposite end of the central shaft, and both ends of this bear constantly upon a ring 76, which is connected to one of the wires 23 or 24. (See Fig. 1.) The two circuit-setting switches and their short-circuiting attachments together, which make up the circuiting device, are constructed precisely alike, although their respective parts are connected with different wires. The lower ring 76 in the switch A is connected to the wire 23, while the corresponding part in the switch B is connected to wire 24. The contacts 1 2 3, &c., in switch A of the circuit-setting device are connected by individual wires in the corresponding contacts in the switch $a$ of the operating device, while the respective contacts in the circuit-setting switch B are connected by individual wires to the corresponding contacts in the switch $b$ of the operative device. This will appear more clearly upon reference to Fig. 1, in which the individual wire connecting the contacts in switch A with those in switch $a$ are numbered $1^a$ $2^a$ $3^a$, &c., and those connecting the contacts of switch B and $b$ are numbered $1^b$ $2^b$ $3^b$, &c.

Figure 8:
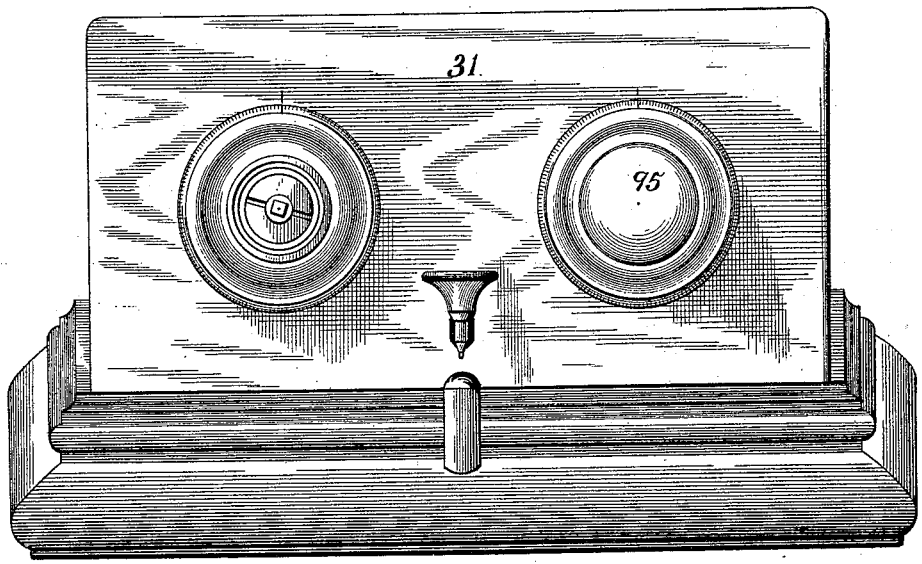
Figure 9:
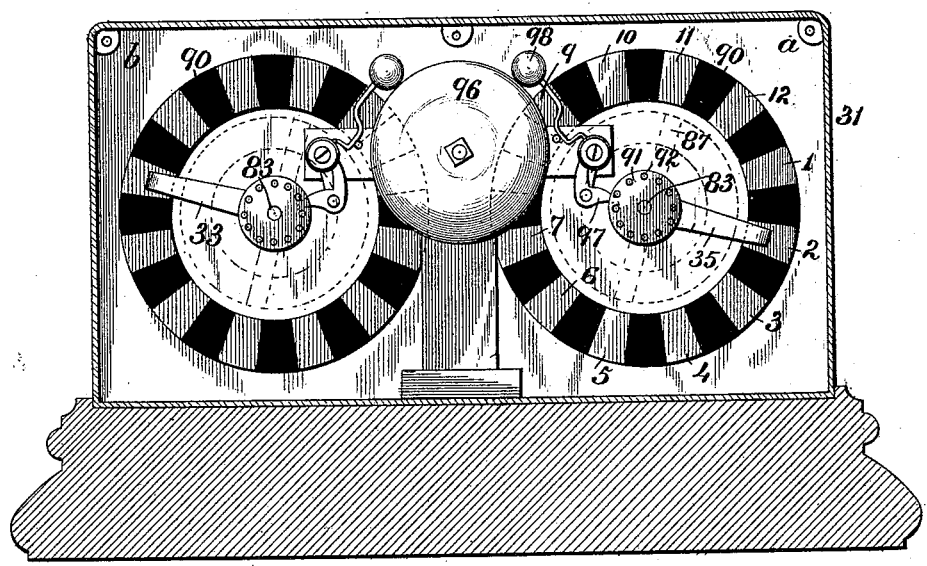

Referring to Figs. 8, 9, and 10, which represent the controlling device 31, 80 represents a suitable base, and 82 represents a housing, preferably constructed of a strong metal and set at an incline in the base for the purpose of presenting the parts to be operated by hand in more convenient positions, and this housing 81 is provided with a vertical longitudinal partition 82, preferably formed of vulcanite or insulating material. In the housing 81 are mounted two complete switches, constructed precisely alike, but connected to different wires; but one of these switches need be described minutely, and the construction will be best understood by referring to Figs. 9 and 10, in which 83 represents a shaft projecting transversely through the housing 81, mounted in a sleeve 84, and having a square end 85 for the reception of a key by which it is turned. The shaft 83 is divided into two parts by an insulating-coupling 86, and the rear part of the shaft 83 carries a switch-arm 87, adapted to contact with a ring 88, against which ring said switch-arm is held by means of a spiral spring 89. The switch-arm 87 is preferably located on the front side of the partition 82, to which the ring 88 is attached, and on the opposite side of said partition is located the contact-ring 90, containing the insulating-contacts 1, 2, 3, &c., of the switch $b$, while mounted upon said shaft 83 and in contact with said ring is the switch-arm 35, hereinbefore referred to. On the extreme inner end of the shaft 83 is located a pinion 91, having inwardly-projecting pins 92 for the purpose hereinafter specified. 93 represents a collar surrounding the sleeve 84 and carrying on it the internal screw-thread 94, which receives the corresponding exterior thread of false knobs 95, said knobs being adapted to completely conceal the ends 85 of shafts 83. The knobs 95 are constructed to resemble the ordinary knobs of a combination-lock as an additional safeguard, although it is necessary to remove them and apply a key to the ends of the shafts before said shafts can be turned to perform the function for which they are constructed, and which will be understood upon reference to Fig. 9, which shows an elevation of the rear side of the operating device with the wall of the housing removed. The switch-arms 33 35 are rotated by the shaft 83, so as to bring said arms in contact with either one of the contacts in ring 90. The positions of the switch-arms 33 35 relative to the connecting-rings are not indicated in any manner on the surface of the housing 81; but they are turned back to a starting-point, as 1, and then moved around in the proper direction, when their movements will be indicated by a bell 96. In order to indicate accurately the movement of the arms 33 35, the pins 92 of pinions 91 equal in number the contacts and are proportionally spaced. The bell-cranks 97 project between the pins 92 on the pinions 91 and are engaged by said pins, and, being connected in a suitable manner to clappers 98 of the bell 96, each time either of the switch-arms 33 35 moves the distance from one contact to the other the bell will sound as the switch reaches the latter contact. It is thus made very easy to adjust the switch-arms to the proper contacts by counting the number of strokes of the bell as the shafts 83 are slowly turned by means of a suitable key. When the proper circuit has been established—that is to say, when the switch-arms 33 35 have been moved upon those contacts corresponding to the contacts upon which the switch-arms rest in the circuit-setting device—the electro-magnetic controlling device will still remain, for the reason that the circuit through the magnets will still be open, and if the circuit be closed the central bar will not be released, for the reason that the armature of the electro-magnet must be vibrated a sufficient number of times to turn the ratchet-wheel, and through it the fixed and loose wheels which carry the engaging pins, until the cam and pin on the loose wheel may operate to unlock and then move the fourth lever 16, hereinbefore referred to with reference to Figs. 1 and 5. In order to provide for thus making and breaking the circuit the requisite number of times, a key 99 and contact-post 100 are mounted in the operating-instrument, as shown in Figs. 8 and 10. The key has a stem 101, which passes through a front wall of the housing and is secured rigidly in the partition 82. The elasticity of the stem 101, which may be of spring-wire, is sufficient to keep the key 99 elevated from the post 100, and the circuit therefore is completed by simply depressing the key repeatedly upon the post. In connecting the instrument 31 to the circuits, the key 99 may be connected by the wire 25 (shown in Figs. 1 and 10) to the positive pole of the battery 27. The post is connected to one of the contact-rings 88 by a wire 102. From the rings 88 the current passes through the switch-arms 87, thence through shaft 83 to the switch-arm 33, then through the particular contact in the contact-ring 90 of switch *b*, through the special wire to the corresponding contact in switch B, thence through contact-arms 32 to the contact-ring 76 in switch B, then through wire 23 to the electro-magnetic controlling device, thence over wire 23 through switch A, through the particular wire which connects A and *a*, upon which the switch-arms rest, thence to the contact in switch *a*, thence to the contact-ring 88 in switch *a*, and thence over wire 26 to the negative pole of the battery.

Having thus described my invention, the following is what I claim as new therein and desire to secure by Letters Patent:

1. A combination electric lock comprising an electro-magnetic controlling device, a suitable source of electricity, a circuit including said controlling device and source whose respective wires are divided, a set of conductors interposed between the two parts of each wire of the circuit, and means for connecting the two ends of each circuit-wire with opposite ends of any wire in the interposed sets, for the purpose set forth.

2. In a combination electric lock, the combination of the bolt-work, the electro-magnetic controlling device, a suitable source of electricity, a circuit including the source and controlling device, the wires of which circuit are divided, two sets of conductors, a circuit-setting device comprising two switches adapted to connect one end of each of the respective circuit-wires with any conductor at one end of each set, and a circuit-closing device comprising a pair of switches adapted to connect the other ends of the respective circuit-wires with any wire at the other ends of the respective sets, substantially as and for the purpose set forth.

3. In a combination electric lock, the combination of the bolt-controlling levers, the electro-magnetic device controlling said levers, the source of electricity, the circuit-setting device comprising two switches electrically connected to the respective poles of said electro-magnetic device, the circuit-closing device comprising two switches connected to the respective poles of the source, two sets of wires running between corresponding switches in the circuit devices and with any wires of which sets the corresponding switches are adapted to connect, and a short-circuiting device connected with one of the said circuit devices, whereby a through circuit is always obtained, substantially as and for the purpose set forth.

4. In a combination electric lock, the combination of the bolt-controlling levers, the electro-magnet controlling the levers, the circuit-setting device comprising two switches connected to the respective poles of the electro-magnet and having each an independent set of contacts, a suitable source of electricity, a circuit-closing device comprising two switches connected to the respective poles of the source and having each an independent set of contacts, and two independent sets of wires running between contacts in the corresponding sets in the circuit setting and closing devices, substantially in the manner and for the purpose set forth.

5. In an electric lock, the combination of the bolt-controlling levers, the electro-magnet controlling said levers, the circuit-setting device comprising switches, each of which has a number of contacts, connection between said switches and the respective poles of the electro-magnet, a circuit-closing device comprising switches, each of which has a number of contacts, a suitable source of electricity, electrical connection between the switches of the circuit-closing device and the respective poles of the source of electricity, individual wires connecting the respective contacts of each switch in the circuit-setting device with the corresponding contacts of the switches of the circuit-closing device, and a short-circuiting device applied to the circuit-setting device and consisting of a conductor having detachable electrical connection with each contact of the switches in said circuit-setting device, all substantially as set forth.

6. The combination of the bolt-controlling lever 7, having the end 12, the lever 14, engaging the end 12 and having its fulcrum 15 located near the vertical line of the point of engagement between said lever and end 12, the vertical lever 16, engaging lever 14 and fulcrumed at a point in the line of pressure exerted upon it by the lever 14, and the electro-magnet having positive working connection with said lever 16, substantially as and for the purpose set forth.

7. The combination of the lever, the locking device, the rotating wheel carrying means for engaging the lever and locking device, a shaft by which said wheel is turned, the ratchet mounted on the shaft, and the electro-magnet and its armature carrying a pawl engaging the ratchet, all substantially as set forth.

8. The combination of the fourth lever 16, the locking-lever 60, normally in engagement with said lever 16 for locking it, the rotating wheel 57, having a cam adapted to engage said locking-lever for disengaging it, a pin for engaging the lever 16 for moving it, the electro-magnet, and the armature having working connection with said wheel 57, all substantially as set forth.

9. The combination of the fourth lever 16, having the pins 64 65, the locking bell-crank lever 60, having a spring which forces it normally into engagement with pin 65, a wheel 57, having a cam 59, adapted to engage said locking bell-crank lever to disengage it from pin 55, a pin 58 for engagement with pin 64 for moving the lever, a ratchet connection with said wheel 57, an electro-magnet, and an armature carrying a pawl adapted to operate said ratchet, all substantially as set forth.

10. The combination of the bolt-controlling levers, the fourth lever adapted to engage said bolt-controlling levers, the electro-magnetic controlling device having means for engaging said fourth lever, and socket 21, having spiral spring 22, said spring being adapted to force said fourth lever into engagement with the bolt-controlling levers, substantially as and for the purpose set forth.

11. The combination of the bolt-controlling levers, the fourth lever adapted to engage the same, the spring 21 for forcing the said fourth lever to its work, the rotating wheel for releasing said fourth lever, the ratchet connected with said releasing-wheel, the electro-magnet having an armature engaging said ratchet, and the brake bearing against said ratchet for preventing its running and holding it in its advanced position against the fourth lever-spring, substantially as and for the purpose set forth.

12. The combination of the electro-magnet, the armature, and the return-spring for said armature located upon the forward side of the armature alongside the magnet and consisting of the piston engaging the armature, and the spiral-spring cylinder in which the piston works, substantially as and for the purpose set forth.

13. The circuit-setting device consisting of the switch-arm adapted to be connected to one conductor of a circuit, a number of contacts adapted for connection with individual conductors, and a short-circuiting device consisting of the conducting portion 36, having a separable connection with each one of the said contacts, substantially as and for the purpose set forth.

14. The herein-described circuit-setting device, consisting of pairs of switches adapted for connection with the respective conductor of a circuit, two sets of contacts adapted for connection with individual wires of two sets of conductors, and a short-circuiting device consisting of a conductor having a separable connection with each contact, whereby the ones in use may be cut out from the short-circuiting device and all the others be connected, so as to give a through circuit, as explained.

15. The combination of the switch 32 34, the shaft 73, contact-arm 75, and rings 76, the contact-circles 72, having the insulated contacts therein, the short-circuiting rings 36, having contact-springs 36$^a$, and the screws 69, substantially as and for the purpose set forth.

16. The combination of the switch, the contact-circle having the insulated contacts, and the short-circuiting device consisting of the rings arranged concentrically with the switch and contact-circle and each consisting of the rings 36 66, having the parallel beveled faces, the contact-springs 36$^a$, clamped between said rings, whereby they receive an upwardly-inclined set and adapted to be depressed upon the contacts, and the screws 69, all substantially as set forth.

17. The combination of the pair of circuit-setting switches A B, each consisting of the switch-arm and a number of contacts, the pair of circuit-closing switches, each consisting of a switch and a number of contacts, and two sets of conductors connecting corresponding switches in the circuit setting and closing devices, substantially as explained.

18. The combination of the electro-magnetic controlling device having the pawl carried by the armature and the ratchet for operating the device, the circuit-setting device, the circuit-closing device, and the make and break consisting of the key 99 and contact 100, substantially as and for the purpose set forth.

19. The combination of the casing, the switch mounted in the casing, the shaft for moving the switch, and the false knob 95, controlling the shaft, substantially as and for the purpose set forth.

20. The combination of the casing, the switch, the shaft for moving the switch, and the bell, also operated by the shaft and for indicating the movement of the switch in the manner explained.

21. The combination of the casing, the switch, the shaft for moving the switch, the bell, the striker, and the pinion on the switch-shaft engaging the striker of the bell, substantially as and for the purpose set forth.

22. The combination of the casing, the switch located within the casing and comprising a switch-arm and a number of contacts, the shaft controlling the switch, the pinion on the end of said shaft, the bell, the striker, and the bell-crank lever controlling the striker and engaged by said pinion, the pins in said pinion being equal in number and spaced proportionally to the contacts of the switch, as and for the purpose set forth.

23. The combination of the casing, the switch located in the casing, the shaft controlling said switch and provided with the insulating-coupling, the sleeve inserted in the front wall of the casing surrounding the shaft, the collar surrounding said sleeve, and the false knob secured to said collar, all substantially as and for the purpose set forth.

24. The combination of the casing, the partition in the casing, the shaft passing through said casing and partition, the switch-arms carried by said shaft on opposite sides of the partition, and the contact-circle and contact-ring located on the respective sides of said partition, substantially as and for the purpose set forth.

25. The combination of the casing having the partition, the shaft carrying the switch-arms, the contact-ring and contact-circle located on opposite sides of the partition and in contact with the respective arms, and the key and the post, said key and post being connected the one to a suitable source of electricity and the other to the contact-ring, substantially as and for the purpose set forth.

26. The combination of the casing having the central partition, the shafts extending through said casing and partition, the switches supported by said shaft and partition, the make-and-break device located between the shafts and consisting of the post mounted in the base, and the key extending through the wall of the casing and rigidly secured in the partition, substantially as and for the purposes set forth.

JAMES GRAHAM THOMPSON.

Witnesses:
HERVEY S. KNIGHT,
OCTAVIUS KNIGHT.